July 24, 1928.

W. J. BELCHER 1,678,457

CHAIN DRIVE GEARING

Filed March 29, 1922  5 Sheets-Sheet 1

Warren J. Belcher  Inventor

By Gifford & Bull
his Attorneys

July 24, 1928.

W. J. BELCHER

CHAIN DRIVE GEARING

Filed March 29, 1922

Warren J. Belcher  Inventor

By Gifford & Bull
his Attorneys

July 24, 1928.

W. J. BELCHER 1,678,457

CHAIN DRIVE GEARING

Filed March 29, 1922        5 Sheets-Sheet 3

Patented July 24, 1928.

1,678,457

UNITED STATES PATENT OFFICE.

WARREN J. BELCHER, OF HARTFORD, CONNECTICUT, ASSIGNOR TO THE WHITNEY MFG. CO., OF HARTFORD, CONNECTICUT, A CORPORATION OF CONNECTICUT.

CHAIN-DRIVE GEARING.

Application filed March 29, 1922. Serial No. 547,628.

My invention relates to new and useful improvements in chain drive gearing, and more particularly to the type wherein the chain embodies a plurality of overlapped link plates joined at their overlapped portions by transverse bearing members, and having teeth to cooperate or engage with the teeth of gear members in order to transmit motion from one gear member to another.

The primary object of my invention, among others which will appear from the following specification, is to provide a chain and gear drive in which a chain of a given size or pitch will have increased strength and capacity to resist wear, particularly at the bearing portion or joint between the links, over chains of like size hitherto known, and so that it will have the added advantage of being practically noiseless in operation.

My invention is particularly applicable to the type of chain shown in my prior Patent No. 1,020,180, dated March 12, 1912, which has been found particularly efficient as regards length of life in service, and in the absence of such elongation as will cause it to ride over the gear teeth and result in improper timing of the driven members, particularly when used for driving cam shafts, magneto shafts, or other parts driven from the crank shaft of an internal combustion engine of automobiles, tractors, etc.

In the manufacture of these chains of all sizes, it has been usual to so design the same that the bearing pins and bushings for each size are so proportioned as to give proper strength and obviate wear, so far as possible, at the chain joint between the links. While the smaller sizes of chains were desirable in automobile drives because of the lack of noise, in some instances such chains have not been adopted because of supposed short life of the joint due to wear on the small parts constituting the same, for example, the pin in the type of chain disclosed in my above prior patent. Therefore, in order to be able to use the chains of small size for the purpose mentioned, because of their desirability arising from the lack of noise, I have conceived that such chains can be rendered highly efficient for the purpose stated by joining the plate links at their overlapping portions by a bearing of a size which would ordinarily be employed for a larger sized link, and which it has hitherto been thought impracticable in the chain of smaller size because of consequent weakening of the joint. For example, I have discovered that by making a ⅜ inch pitch chain with the joints of a size employed usually in a ½ inch pitch chain, I combine in a single structure the strength of the ½ inch, or even larger, pitch chain and the quietness and smoothness in running of a ⅜ inch pitch chain. In fact, in the example just mentioned, the reconstruction of the chain in order to accommodate the enlarged bearing of the ½ inch pitch chain affords a ⅜ inch pitch chain having not only greater strength than the ½ inch pitch chain, but a strength equal substantially to that of a ⅝ inch pitch chain. It has also been found that the invention when applied even to pitches of chains of ½ inch and greater, that the same result follows as when the invention is applied to a ⅜ inch pitch chain, namely, that not only are the strength and life of the joints greatly increased, but the chain is rendered exceedingly quiet and smooth in running or action. In order to accomplish this result, it has been necessary to reconstruct the form of the plate link, the teeth carried thereby, and also the form of the gears with which the chain cooperates, all of which will be more fully described hereinafter.

The invention consists in the improvements to be more fully described hereinafter, and the novelty of which will be particularly pointed out and distinctly claimed.

In the accompanying drawings to be taken as a part of this specification, I have illustrated a preferred embodiment of my invention, in which—

Before proceeding with a detailed description of a preferred embodiment of my invention, and in order that the same and its principle and advantages may be better understood, I would state that in designing chains of this general type, and the gears upon which they are used, it is usual to have the plate links of different length pitch, according to the use to which the chain is to be put, and in order to cooperate with gears of certain sizes or having a certain number of teeth. By "pitch" is meant the linear distance between the centers of the bearing apertures in the links. For example, it is common to manufacture these chains in a series of pitches beginning, say, with 3/8 inch pitch and increasing the pitch by 1/8 of an inch up to any size desired. In designing the gears it is usual to employ any desired number of teeth, say, from 13 to 150 teeth, and design the pressure or engaging areas or faces on the links and on the gear teeth so that said areas or faces will properly engage in the passage of the chain over the gear, and so that the pressure areas or faces lie parallel to each other while in contact and while the chain is transmitting power to, or receiving power from, the gear.

In the construction of a 3/8 inch pitch chain of the type mentioned, and as shown in my said patent, it as been usual to join the units by bushings having an outside diameter of .165 of an inch, and an inside diameter of .110 of an inch, the joint being completed by a bearing pin having an outside diameter of approximately .109–.1095 of an inch. In a 1/2 inch pitch chain, it has been usual to employ a bushing of an outside diameter of .218 of an inch and an inside diameter of .156 of an inch, and a pin of .155 of an inch. It will be understood that the proportions of the bushings and pins are proportionately increased for links of larger pitch. According to my present invention, by way of example, I so construct the plate link as to enable me to employ in a 3/8 inch pitch link plate a bushing and pin of a size such as has ordinarily been employed in chains of 1/2 inch pitch links, which, as stated, has necessitated the redesigning and construction of the chain link and the gear and gear teeth in order to obtain proper interengagement without destroying the diameter of the pitch circle which must be maintained, and also so as to afford proper pressure area on the tooth and adequate metal in the link plate around the bushing so that the plate will not be weakened by the enlarged aperture formed therein.

I will now proceed to describe one embodiment of my invention, the same, by way of example, being set forth as applied to a chain of 3/8 of an inch pitch, that is, wherein the distance between the centers of the bearing openings through each plate link is 3/8 of an inch.

Figure 1:
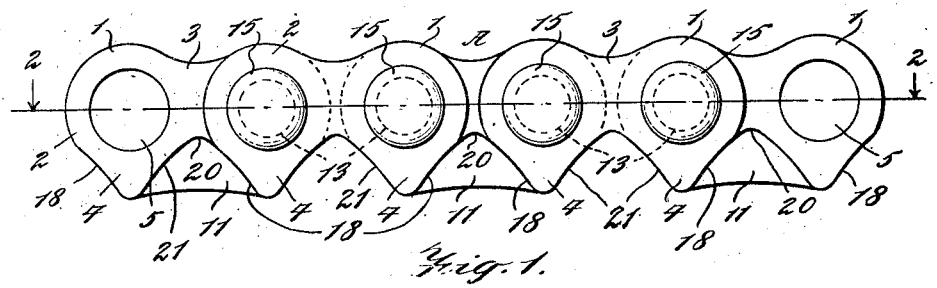
Figure 1 is a view in side elevation of a section of chain constructed according to my invention, the same showing links of ⅜ inch pitch, and being enlarged three times.
Figure 2:
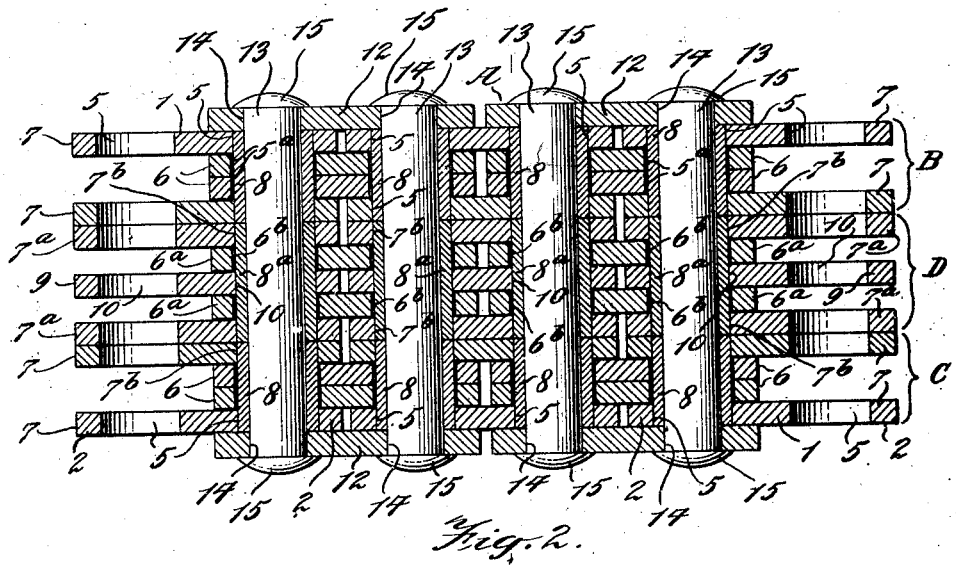
Fig. 2 is a longitudinal section on the line 2—2 of Fig. 1.
Figure 3:
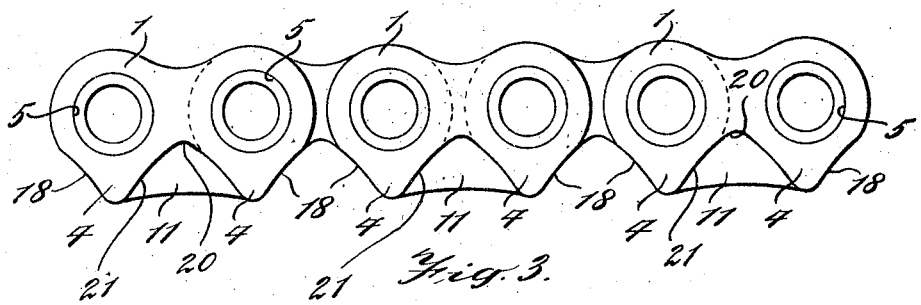
Fig. 3 is a view similar to Fig. 1, but with the outer links and the pins omitted in order to show the link construction and the bushings.
Figure 4:
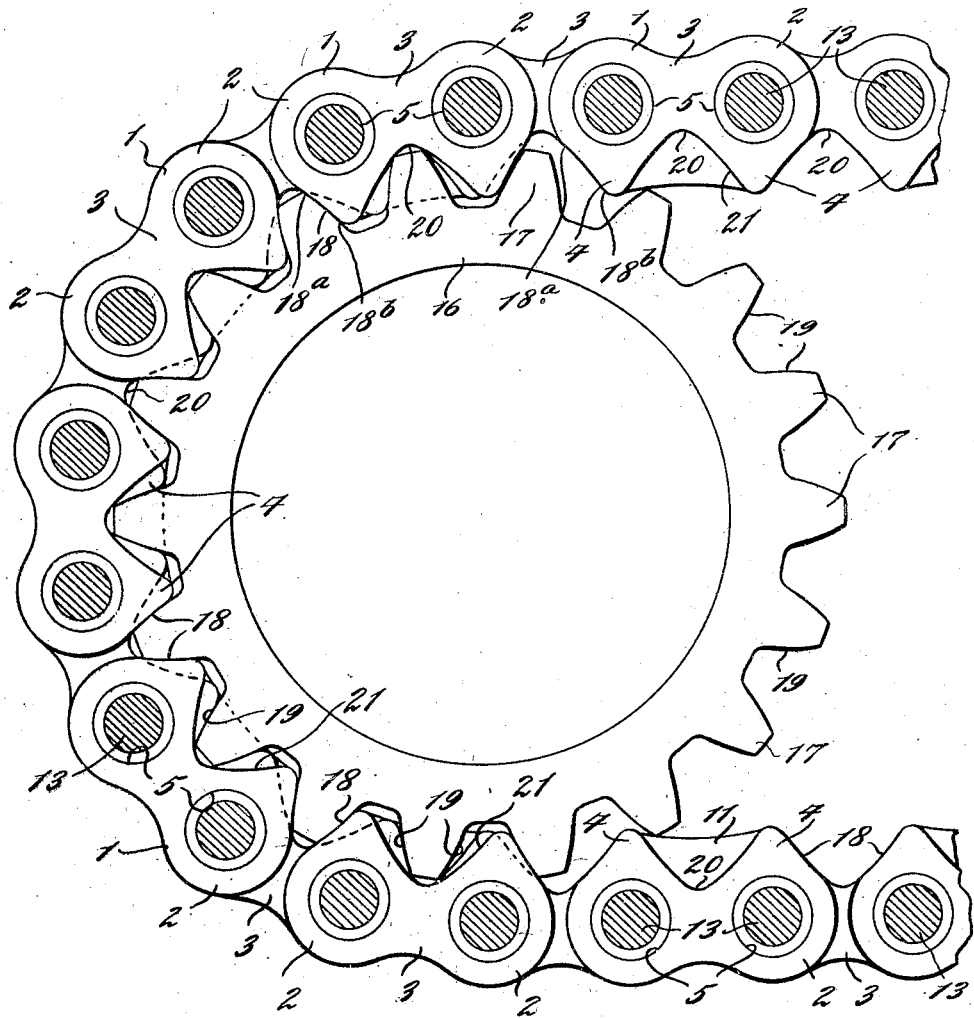
Fig. 4 is a view in end elevation of a gear and chain embodying my present invention, the chain being shown in power-transmitting engagement with the teeth of the gear.

Referring particularly to Figs. 1 to 4 of the drawings, A designates a section or portion of a chain embodying my invention. This chain is made up of a plurality of flat link plates 1, each of which is formed at its ends with opposite heads 2 joined by an intermediate body portion 3. These links are each provided with end teeth 4, 4 of novel construction, and adapted to cooperate with a driven or driving gear or sprocket, as will be more particularly described hereinafter. The head of each link is provided with a circular aperture 5 adapted to receive the joint-forming member or members, by means of which the said link plates are assembled in overlapped relation to constitute a chain. In assembling the chain, the link plates are arranged in overlapping relation, so that the bearing apertures 5 in the ends of one link register with a corresponding aperture 5 in the next preceding link, and the next following link, respectively, the joint being completed by a joint-forming member extending transversely of the chain. My invention is not limited to any particular overlapping arrangement of the link plates, but I prefer to build up a chain of the proper width by composing the same of a series of chain units, in the manner described in my patent aforesaid, for example, as illustrated in Fig. 2 of the drawings.

In Fig. 2, the chain is shown as built up of three chain units, B, C and D, respectively. In this embodiment, the chain comprises two outer chain units B, C, each being composed of pairs of link plates 6 connected by pairs of overlapping outer link plates 7, said links being of the same form as the links 1 heretofore described, the outer links 7 being connected by bearing members in the form of bushings 8 rigidly seated in apertures 5 in said links, and extending loosely through alining apertures 5ª in the pairs of links 6. It will be understood that the ends of the bushing are rigidly seated and held in the apertures 5 in the links 7, but the apertures 5ª in the links 6 are made slightly larger than the apertures 5 so that the link plates 6 may turn freely on said bushings. The inner or central unit D of the chain may be of the same construction as the outer units, but in some instances I may prefer to construct the same of spaced link plates 6ª, and outer connecting link plates 7ª, the latter being connected by bushing 8ª arranged in openings 7ᵇ therein, and extending loosely through the openings 6ᵇ in the plate 6ª, said bushings being rigidly mounted in said openings 7ᵇ, and the openings 6ᵇ loosely receiving said bushings in the same manner as that heretofore described with reference to the links of the outer unit. However, the inner unit may include guide plates 9 each having end openings 10 in which the bushings 8ª are rigidly mounted, said guide plates 9 serving to maintain the chain elements 6ª in spaced relation. The guide plate is provided with a web 11 bridging the space between the teeth 4 and adapted to cooperate with a peripheral groove in the teeth of a gear or sprocket in a manner hereinafter described, in order to prevent sidewise movement of the chain in passing to and from the gear. I desire it understood, however, that this guide plate specifically forms no part of my invention, but is illustrative of a commerical form of chain embodying my invention. When the chain units are to be assembled, a proper number of such units are arranged side by side until the chain is of the desired width, and the units are then connected by means of outer plates 12 and cross pins 13, the latter extending through openings 14 in said outer plates and through the bores of the alining bushings, whereupon the ends of the pin are headed over, as at 15, whereby the assembled units are maintained in proper relation.

In the embodiment shown, the diameter of the apertures 5, 5ª, 6ᵇ and 7ᵇ are of a size such as would be ordinarily employed in a ½ inch pitch chain, bearing in mind that the invention is illustrated in connection with a ⅜ inch pitch chain. The bushings 8 and and 8ª and the pins 13 are also of a size which would ordinarily be employed in a ½ inch pitch chain, all as hereinbefore set forth.

Figure 7:
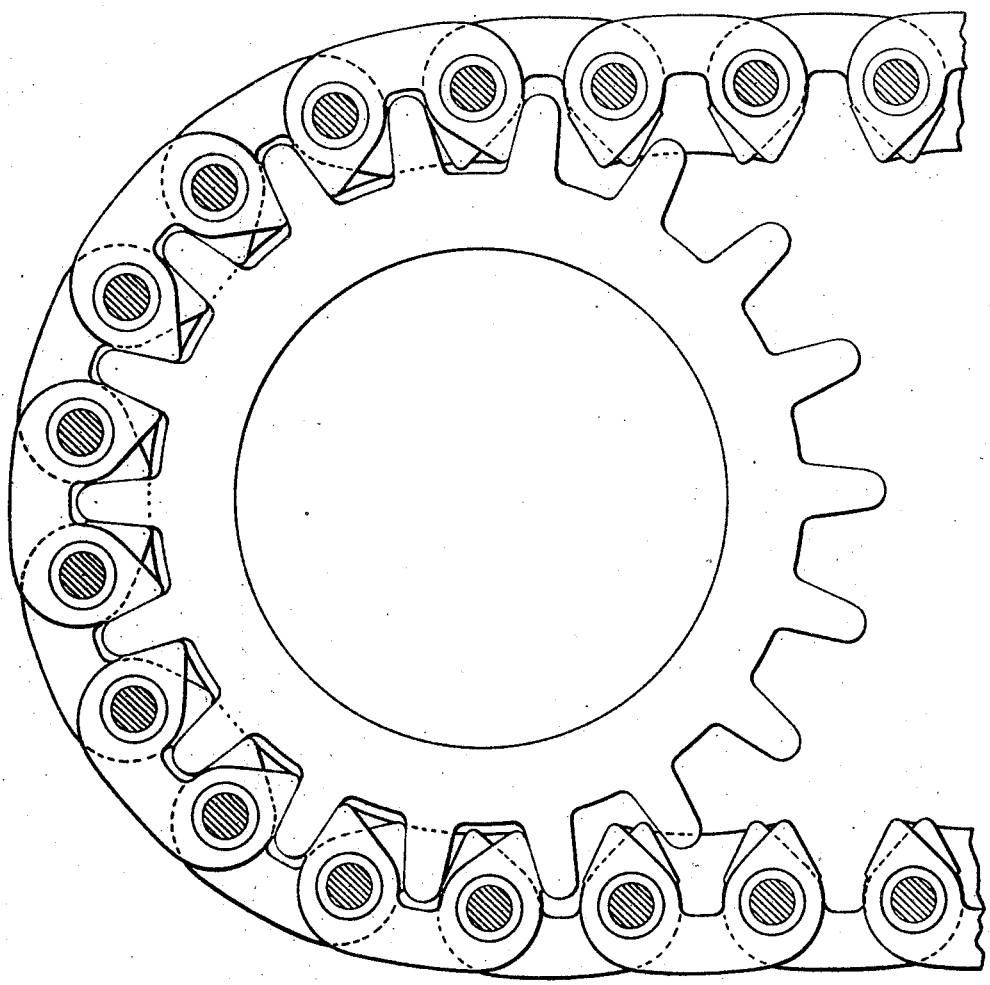
Fig. 7 is a view in end elevation drawn to the same scale as that of Fig. 4, but showing a gear and chain such as is illustrated by my prior patent above mentioned, this figure being provided for comparative purposes with Figs. 1 to 5, inclusive.

In order to maintain the pitch circle of a ⅜ inch pitch chain, and at the same time have the proper amount of metal in the link plate necessary to sustain the joint and give the proper strength against pull exerted on the link plate, I have made the chain link of considerably greater length than hitherto employed in links of this type. For example, in the chain link, such as shown in my said patent, the length of a commerical ⅜ inch pitch chain plate, taken on a straight line through the centers of the bearing apertures, was approximately $2\frac{1}{34}$ of an inch, whereas the ⅜ inch pitch link plate made according to my present invention is approximately $2\frac{3}{34}$ of an inch, which results in the new link being longer than the old link and the ends of adjacent links of the chain being closer together, in view of the fact that the distance between bearing centers is maintained the same, namely, ⅜ of an inch. It will be seen that by this arrangement the end edges of the link heads are closer together than in the case of the old chain, which, for purposes of comparison, is shown drawn to the same scale in Fig. 7 of the drawings. This lengthening of the links in order to provide sufficient metal to support a larger joint, as described, and the consequent narrowing of the space between the ends of the links, requires that the teeth on the gear or sprocket be of such height as not to project substantially in line with the bearing centers of the link joints, as was the case in the old chain; and for this reason I have decreased the diameter of the gear or sprocket so that the ends of the gear teeth will be located in a line substantially beneath the bearing centers or the pitch circle, such gear being illustrated in Fig. 4 of the drawings, in which the body of the gear is shown at 16 and the teeth at 17.

In the case, for example, in an eighteen tooth gear for a ⅜ inch pitch chain, according to my present invention, the diameter of such gear taken at the base of the teeth will be 1.625 inches, the depth of each gear tooth from base to tip approximately .1875 inches, and the overall gear diameter, that is, from tip to tip of the teeth, approximately 2 inches, i. e., 1.972 inches. The width of the tooth at the base, that is, the distance between the engaging faces, is approximately .1875 inches. This produces a gear considerably smaller than the eighteen tooth gear previously employed, the diameter from tip to tip of the teeth in that case being 2.16 inches, the depth of the teeth from base to tip approximately .208 inches and the diameter taken at the base of the teeth approximately 1.708 inches.

In my novel form of link plate, the engaging face 18 on the teeth of the link plate is formed preferably on a concave curve, and the opposite faces of the teeth on the gear are formed preferably on convex curves, as at 19, the curves on the link teeth and the curves on the gear teeth being struck from a common center, that is, on equal radii. These radii are determined with a purpose of having the curved face 18 on the link plate and the curved face 19 on the gear teeth lie in parallelism when in contact between a point closely adjacent the apex of the gear tooth and the apex of the tooth on the chain link. By this construction the teeth on the gear are formed with opposite convexly curved faces from the apex to the base of the tooth, whereby the gear tooth is made considerably thicker at its base than was hitherto possible, as will be apparent from a comparison of Figs. 4 and 7. By this arrangement the chain teeth enter or leave the gaps between the sprocket teeth by a motion entirely toward or away from the sprocket teeth faces without a sliding or slipping motion, and, further, the chain teeth are not worn by fouling of the sprocket teeth, and the sprocket teeth are not worn by fouling of the chain. Also the teeth of the sprocket chain in moving into engagement with the sprocket teeth, or vice-versa, the chain teeth do not contact the gear teeth until the faces 18 and 19 are substantially parallel, which is of importance not only as to the reduction of wear between the teeth, but greatly reduces the sharp engagement which might otherwise result in objectionable noise.

By the arrangement above described, it will also be noted that all of the chain teeth at any particular joint are in alinement transversely of the chain, so that the latter constitutes a true rack when extended horizontally. This arrangement is of advantage because it enables me to so design the chain teeth that the gear or sprocket teeth do not have to project into line with the pitch centers, and the chain teeth will, at the same time, properly grip the sprocket teeth, that is, have sufficient gripping area to have the desired driving action.

I am also enabled to locate the apex of the throat 20 of the link well beneath the centers of the pin bearings, so that the body 3 of the link is considerably widened with the consequent added strength. It will also be noted that the distance between the end surfaces of the links on a line taken through the pitch centers is greatly reduced, in fact is considerably less than the tooth thickness, whereas in the old chain this distance was of necessity greater than the tooth thickness in order to permit the tooth to enter the space between the links.

It is also to be noted that in the present invention the tips or apexes of the gear teeth travel in a circle well within the pitch circle, and, in fact, are substantially in line with a circle tangent to the outside circumference of the bearing bushings, or the bearing apertures in the chain links.

In laying out a chain and sprocket having the characteristics above described embodying my invention, and in which the sprocket or gear is provided with eighteen teeth, I proceed as follows, referring particularly to Fig. 6:

(1) I draw a line $a$—$b$ representing a line extending through the pitch centers of the chain.

(2) At right angles to the line $a$—$b$ I draw a plurality of lines $c$—$d$, each extending through a pitch center, for example, $\frac{3}{8}$ inches apart.

(3) At the intersection of the lines $c$—$d$ with the line $a$—$b$ as a center, I draw circles $a'$ equal to the diameter of the apertures to be formed in the chain links. It will be understood that this aperture in the bushing carrying links 2 will be of such size as to have the bushing of the desired size fit rigidly therein, whereas the opening in the intervening links 6 will be sufficiently large to enable them to fit but turn on the bushings.

(4) I then determine the amount of metal in the link necessary between the circumference of the circles representing the link apertures and the ends of the link, and also between the circle and the throat of the link, and with the line of intersection heretofore mentioned describe a circle $b'$ giving the boundary of the end of the link and the boundary of the throat necessary to give the desired amount of stock in the link plate.

As the result of this operation, I find that the space ordinarily occupied by the old practice has been filled by the stock necessary to give the link the desired strength, so that it is necessary to design the tooth on the gear and also the tooth on the link plate so that there will be proper engagement between these teeth, and, as to this, proceed as follows:

(5) I then determine a tangency circle, the same being drawn around the intersection of the lines $a$—$b$ and $c$—$d$, and draw this circle, as at $c'$.

(6) I then draw the lines forming the 60° angle tangent to the tangency circle and locating the engaging face of the tooth of the link. This 60° angle is determined by a line $e$—$f$ drawn tangent to the tangency circle at the end of the plate and intersecting the line $c$—$d$ to form a 30° angle with line $c$—$d$, and then draw a line $g$—$h$ tangent to the inner side of the circle $c'$, also at an angle of 30° to the line $c$—$d$, which intersects the latter at the point of its intersection with the line $e$—$f$, so that the angle between the lines $e$—$f$ and $g$—$h$ is 60°. The line $g$—$h$ determines the location of the inner face of the tooth which bounds the link throat.

(7) I then draw a line $i$—$j$ at right angles to the line $e$—$f$ and extending through the intersection of the lines $a$—$b$ and $c$—$d$ at the opposite bearing aperture of the same link.

(8) In the preferred form I then describe a circle $d'$ on such a radius as to pass through the intersection of the lines *e—f* and *i—j* and also tangent to the pitch line *a—b*. This determines the proper curve of the convex face 19 on the gear tooth and the concave face 18 on the chain tooth so as to give the desired area of contact face, as shown at the points 18ª, 18ᵇ (see Fig. 4). This same curve will be found to intersect the circle *b'* which bounds the end of the chain link.

(9) The face 21 of the tooth, forming one side of the throat of the link, may then be removed sufficiently so as not to strike the gear tooth when the chain is either passing onto or off of the sprocket.

(10) The end of the chain tooth is also preferably rounded off so that it will not strike the teeth of the gear in passing on and off the same.

Figure 6:
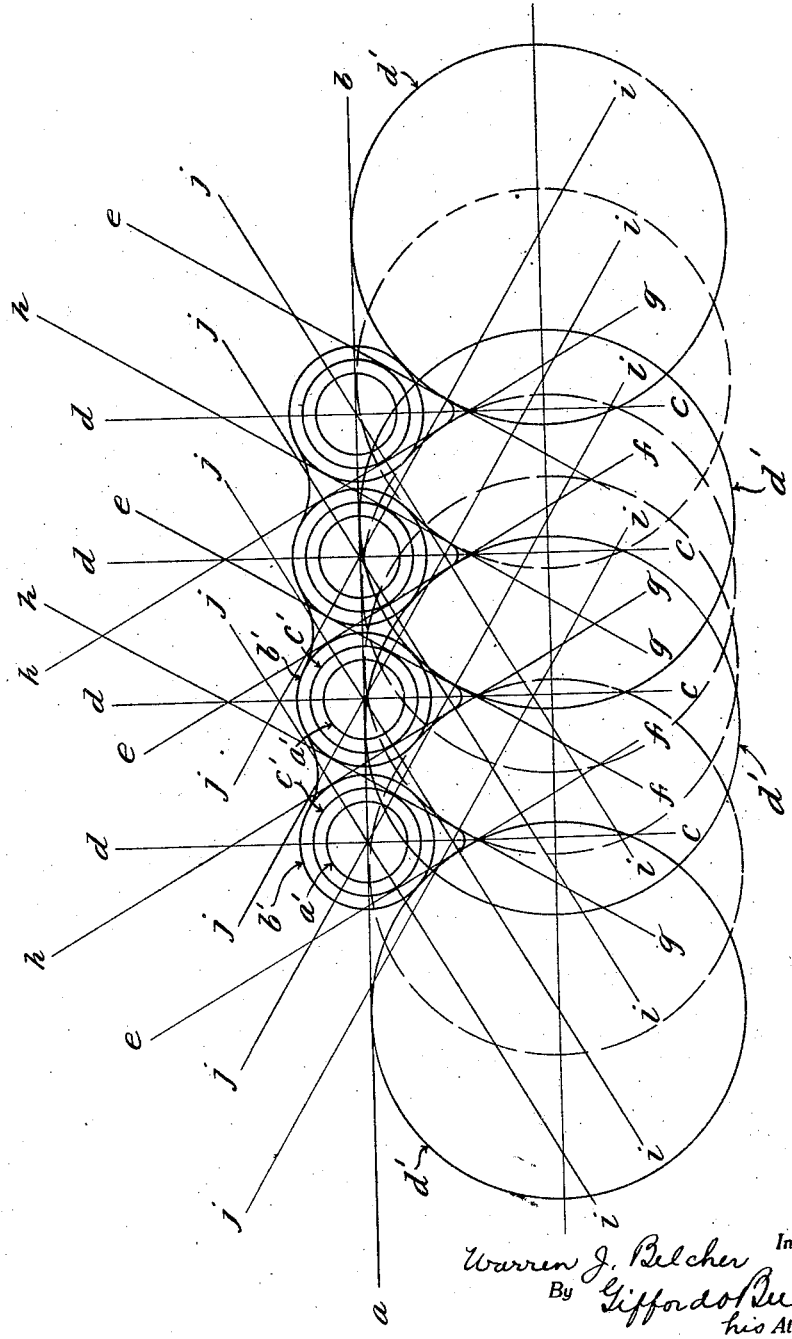
Fig. 6 is a diagrammatic view showing the method of laying out a chain and gear according to a preferred embodiment of my invention.

By the above procedure I determine the form of one end of the link plate and the tooth carried thereby, and it will be understood that the same method is followed in order to properly determine the form of the opposite end of the same link and its tooth, as is indicated by corresponding lines on Fig. 6.

By the construction above described, the lower end of the face 18 of the chain links terminates on or intersects a line extending through the chain joint or bearing and at right angles to a line lengthwise of the chain through the bearing centers, so that the points or apexes of the teeth are located on a line approximately vertical through said bearing and perpendicular to the horizontal run of the chain. In a ⅜ inch pitch chain, the apex of the chain tooth will be approximately $\frac{3}{32}$ of an inch from the bearing center. Also the pressure angle of the face 18 will be so formed relative to the center of movement on the pin 13, that the face 18 does not contact the gear teeth in passing onto the gear until the face 18 is substantially parallel to the face 19 of the gear teeth.

I have described above a construction which is a preferred embodiment of my invention. In the event it should be desired to provide the chain teeth and gear teeth with flat engaging faces instead of the concave and convex faces, as heretofore described, I preferably, in the case of a ⅜ inch pitch chain traveling on an eighteen tooth gear, draw the lines *e—f* and *g—h* (Fig. 6) at an angle of 80° to each other, instead of at an angle of 60°, as heretofore described, and define the engaging faces by these lines, and do not employ the circles *d'* to determine a convex curve on the gear teeth and a concave face on the chain teeth.

I also desire it understood that my invention in its broad aspect is not limited to any specific conformation of the contacting faces of the chain teeth and gear teeth, but is capable of wide variation within the scope of the appended claims.

Figure 5:
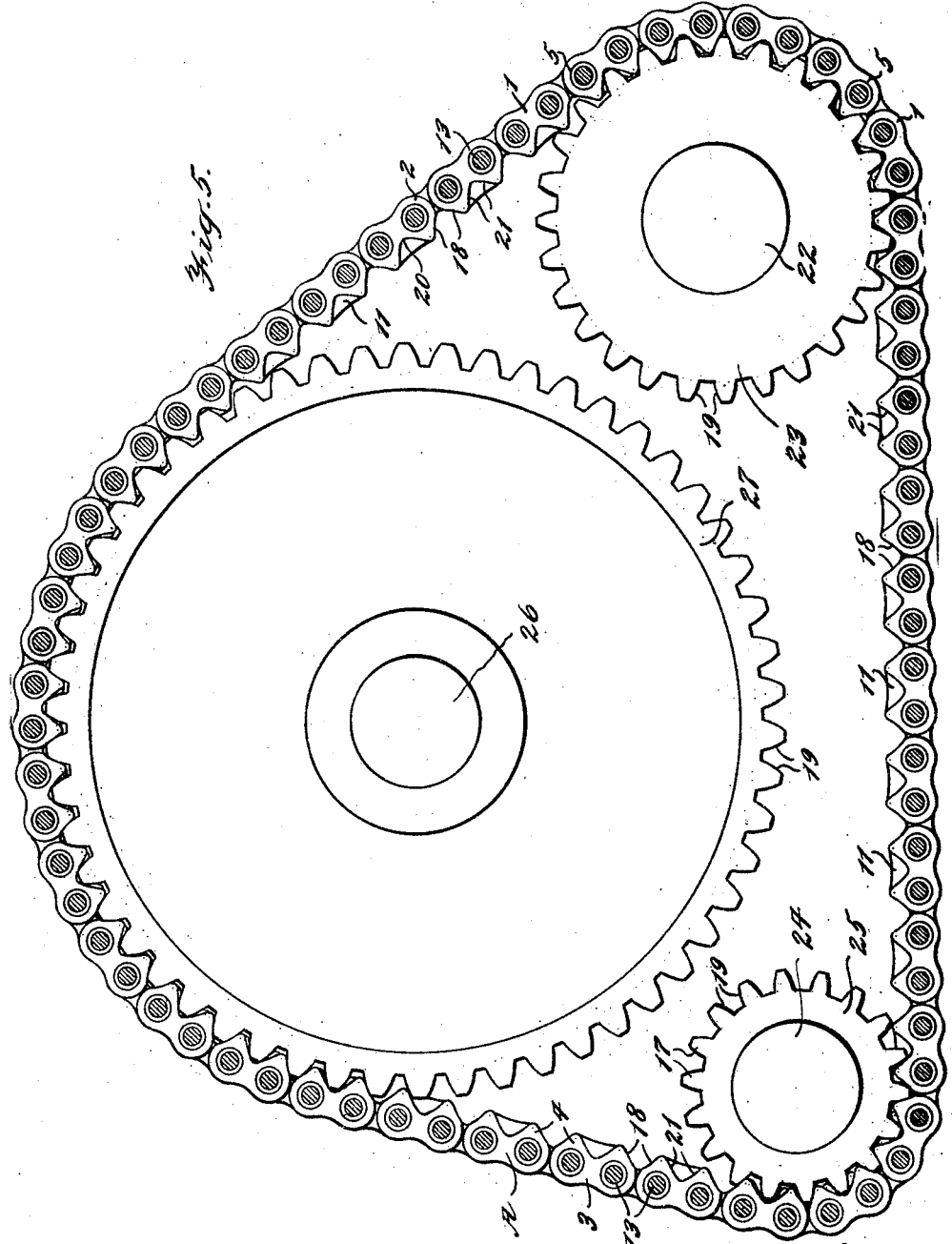
Fig. 5 is a view in end elevation showing the chain in cooperation with the gears on an automobile drive, in which the drive includes a gear on the engine crank shaft, a gear on a generator shaft, and a larger gear on a cam shaft of the engine, the chain being shown as composed of links of 3/8 inch pitch actual size.

In Fig. 5 I have shown a ⅜ inch pitch chain embodying my invention applied to the drive of an automobile engine, and in which figure the chain and gears are drawn to an exact scale. In this embodiment the crank shaft of the engine is shown at 22 carrying a gear 23 having twenty-seven teeth constructed according to my invention. At 24 is shown a generator shaft carrying a gear 25 having eighteen teeth, and at 26 is a cam shaft carrying a gear 27 having fifty-four teeth formed according to my invention. In this case the chain shown generally at A is constructed and its various parts proportioned in the manner heretofore described, as is also the gear 25. In the case of the gears 23 and 27 the height of the teeth is the same as those on the gear 25, but the teeth in the case of the larger gears may be somewhat thicker at the base, although the faces 19 are of the same form and curve as the corresponding faces on the gear 25.

In certain of the appended claims I have used the words "bearing members" and I wish to be understood in using these words, to refer to the transverse member as placed in the link openings, whether that member be bushing fixed in some of the links or a pin having a diameter substantially the same as the bushing. Also the transverse member may be in other forms than just stated, the important feature so far as the meaning of the claims is concerned being that the diameter of the transverse member means a diameter substantially equal to the diameter of the link opening.

I desire it understood that the invention is not limited in its application to a chain of any particular pitch, but may be applied to chains of a pitch either less or greater than the pitch given in the example described, and that in applying the invention to such chains the areas, dimensions, arrangement, etc. will be proportional to those described with reference to a ⅜ inch pitch chain.

What I claim and desire to secure by Letters Patent of the United States is:

1. In combination, a gear having radial teeth, and a transmission chain composed of a plurality of overlapped toothed links cooperable with said gear, and transverse bearing members having a diameter not less than one-half the pitch length of the chain connecting the overlapped portions of said links.

2. In combination, a gear having radial teeth, and a transmission chain composed of of a plurality of overlapped toothed links cooperable with said gear, and transverse bearing members having a diameter not less than one-half the pitch length of the chain connecting the overlapped portions of said links, said bearing members being located outside the gaps between the gear teeth.

3. In a combination, a gear having radial teeth, and a transmission chain composed of a plurality of overlapped toothed links co-operable with said gear, transverse bearing members connecting said links and having a diameter not less than one-half the pitch length, the contact or pressure area between the teeth on the gear and the teeth on the links being located inside a circle through said bearing members when the chain is engaged with said gear, the ends of alternate links being a distance apart less than any effective tooth thickness.

4. In combination, a gear having radial teeth, and a transmission chain composed of a plurality of overlapped toothed links co-operable with said gear, transverse bearing members connecting said links and having a diameter not less than one-half the pitch length, the contact or pressure area between the teeth on the gear and the teeth on the chain being located inside a circle located inside points on the inner sides of the circumferences of said bearing members when the chain is engaged with said gear.

5. In combination, a gear having radial teeth, a transmission chain comprising overlapped link plates connected by transverse bearing members, having a diameter not less than one-half the pitch length and having teeth to engage the teeth of the gear and in which the elements of the chain and those of a gear having twelve teeth are so proportioned that the distance between the ends of alternate links is less than the thickness of the gear teeth.

6. In combination, a gear having radial teeth, a transmission chain comprising overlapping link plates connected by transverse bearing members having a diameter not less than one-half the pitch length and having teeth to engage the teeth of the gear and in which the elements of the chain and those of a gear having twelve teeth are so proportioned that the distance between the ends of alternate links is less than the thickness of the gear teeth, and the transverse bearing members are located outside the gaps between the teeth.

7. In combination, a gear having radial teeth, a transmission chain comprising overlapped link plates connected by transverse bearing members having a diameter not less than one-half the pitch length and having teeth to engage the teeth of the gear and in which the elements of the chain and those of a gear having twelve teeth are so proportioned that the distance between the ends of alternate links is less than the thickness of the gear teeth, and the transverse bearing members are located outside the gaps between the teeth, and the chain teeth being so formed that the faces of the chain teeth do not contact the faces of the gear teeth until substantially parallel thereto.

8. A power transmission chain comprising overlapped links having teeth to engage with teeth of a sprocket gear, transverse bearing members having an outside diameter not less than one-half the pitch length of the chain connecting the overlapping portions of the links, said bearing members being located outside the gap between the teeth of the sprocket gear.

9. In combination, a toothed sprocket gear, a power-transmission chain comprising overlapped links having teeth to engage the teeth of the sprocket gear, said links being connected at the overlapped portions by transverse bearings, having a diameter not less than one-half the pitch length of the chain, the apexes of the gear teeth being on a circle tangent to said bearings.

10. In combination, a toothed sprocket gear, a power transmission chain comprising overlapped links having teeth to engage the teeth of the sprocket gear, said links being connected at the overlapped portions by transverse bearings comprising bushings and pins having a diameter not less than one-half the pitch length of the chain, the apexes of the gear teeth being on a circle tangent to said bushings.

11. In a transmission gear, in combination, a gear having teeth formed with engaging faces, a transmission chain comprising overlapped link plates having teeth formed with faces to contact with said faces on the teeth on said gear, transverse bearing members having a diameter not less than one-half the pitch length of the chain connecting said link plates, the face on each link tooth terminating at one end at the tooth point substantially on a line extending through the bearing center at substantially right angles to a straight run of the chain, the other end of said tooth face terminating at a point within a circle concentric with said gear, and tangential to innermost points on the circumferences of said bearing members.

12. In a transmission gear, in combination, a toothed gear, and a transmission chain comprising overlapped link plates connected by transverse bearing members, and having teeth to engage the teeth of the gear, and in which the gear and chain elements have substantially the following proportions: the outside diameter of the gear is approximately 2 inches, and the chain is composed of links of ⅜ inch pitch and in which the chain links are each approximately ⅔ inches in length, and are joined by a bushing and pin bearing in which the bushing has an outside diameter of .218 inches, the apexes of the chain teeth are approximately $\frac{9}{32}$ inches from the bearing centers, and the pitch circle is approximately 2.160 inches.

13. In a transmission gear, in combination, a toothed gear, a transmission chain comprising overlapped link plates connected by transverse bearing members and having teeth to engage the teeth of the gear and in which the gear and chain elements have substantially the following proportions: the outside diameter of the gear is approximately 2 inches, and the chain is composed of links of ⅜ inch pitch in which the chain links are each approximately $\frac{23}{32}$ inches in length and are joined by a bushing and pin bearing in which the bushing has an outside diameter of .218 inches, the apexes of the chain teeth are approximately $\frac{9}{32}$ inches from the bearing centers, and the pitch circle is approximately 2.160 inches, the gear teeth having convex engaging faces and the chain teeth having concave engaging faces lying in parallelism when in driving contact.

14. In a transmission gear, in combination, a toothed gear, a transmission chain comprising overlapped link plates connected by transverse bearing members and having teeth to engage the teeth of the gear and in which the gear and chain elements have substantially the following proportions: the outside diameter of the gear is approximately 2 inches, and the chain is composed of links of ⅜ inch pitch in which the chain links are each approximately $\frac{23}{32}$ inches in length and are joined by a bushing and pin bearing in which the bushing has an outside diameter of .218 inches, the apexes of the chain teeth are approximately $\frac{9}{32}$ inches from the bearing centers, and the pitch circle is approximately 2.160 inches, the gear teeth each having engaging faces and the chain teeth each having engaging faces lying in parallelism when in driving contact, the engaging face on each chain tooth terminating at the point of the chain tooth on a line through the bearing pin at right angles to a straight run of the chain.

15. In a transmission gear, in combination, a toothed gear, a transmission chain comprising overlapped link plates connected by transverse bearing members and having teeth to engage the teeth of the gear, and in which the gear and chain elements have substantially the following proportions: the outside diameter of the gear is approximately 2 inches, and the chain is composed of links of ⅜ inch pitch and in which the chain links are each approximately $\frac{23}{32}$ inches in length and are joined by a bushing and pin bearing in which the bushing has an outside diameter of .218 inches, the apexes of the chain teeth are approximately $\frac{9}{32}$ inches from the bearing centers, and the pitch circle is approximately 2.160 inches, the gear teeth each having convex engaging faces and the chain teeth each having concave engaging faces lying in parallelism when in driving contact, the concave engaging face on each chain tooth terminating at the point of the chain tooth on a line through the bearing pin at right angles to a straight run of the chain.

16. In a transmission gear, in combination, a toothed gear, a transmission chain comprising overlapped link plates connected by transverse bearing members and having teeth to engage the teeth of the gear, and in which the gear and chain elements have substantially the following proportions: the outside diameter of the gear is approximately 2 inches, and the chain is composed of links of ⅜ inch pitch and in which the chain links are each approximately $\frac{23}{32}$ inches in length, and are joined by a bushing and pin bearing in which the bushing has an outside diameter of .218 inches, and inside diameter of .156 inches, and the pin a diameter of .155 inches.

17. A power-transmission chain comprising overlapped link plates connected by transverse bearing members and having teeth adapted to engage the teeth of a sprocket gear, the overlapped portions of said plates having bearing apertures receiving transverse bearing members, the proportions of said elements being substantially as follows: in a chain of ⅜ inch pitch the length of each link being $\frac{23}{32}$ inches, the bearing opening being approximately .156 inches, the transverse bearing member having a diameter of approximately .155 inches, and the apex of each tooth being approximately $\frac{9}{32}$ (.28125) inches from its adjacent bearing center.

18. A power transmission chain comprising overlapped links having teeth to engage with teeth of a sprocket gear, transverse bearing members connecting said overlapped links to form joints, said transverse members having an outside diameter not less than ½ the pitch length of the chain.

19. A power transmission chain comprising overlapped links having teeth to engage with teeth of a sprocket gear, transverse members passing through the overlapped ends of said links to form joints, said transverse members having an outside diameter not less than ½ the pitch length and substantially $\frac{3}{10}$ the length of the links.

20. A power transmission chain comprising overlapped links, transverse bearing members passing through openings in said overlapped links forming a joint, the diameter of said bearing members being not less than ½ the pitch length of the chain and the pitch length of the chain being not less than ½ the length of the links.

In testimony whereof I have hereunto signed my name.

WARREN J. BELCHER.